United States Patent Office 3,649,703
Patented Mar. 14, 1972

3,649,703
HYDROGENATION OF AROMATIC
HYDROCARBONS
Richard E. Rausch, Mundelein, Ill., assignor to Universal
Oil Products Company, Des Plaines, Ill.
No Drawing. Division of applications Ser. No. 833,664,
June 16, 1969, and Ser. No. 837,924, June 30, 1969,
which applications are continuation-in-part of applications Ser. No. 819,114, Apr. 24, 1969, and Ser. No. 825,084, May 15, 1969. This application Aug. 10, 1970, Ser. No. 62,696
Int. Cl. C07c 5/10
U.S. Cl. 260—667
9 Claims

ABSTRACT OF THE DISCLOSURE

A cycloparaffin producing process utilizing a catalytic composite of a porous carrier material, a tin component and a rhenium component. In one embodiment, the catalyst additionally contains a Group VIII noble metal component. Potassium and lithium constitute preferred alkalinous metal components.

RELATED APPLICATIONS

The present application is a division of my copending applications, Ser. No. 833,664, filed June 16, 1969, and Ser. No. 837,924, filed June 30, 1969, which applications are continuation-in-part of my copending applications, Ser. No. 819,114, filed Apr. 24, 1969, and Ser. No. 825,084, filed May 15, 1969, respectively, all the teachings of which copending applications are incorporated herein by specific reference thereto. This application is filed to comply with a requirement for restriction in my applications, Ser. Nos. 833,664 and 837,924.

APPLICABILITY OF INVENTION

The present invention encompasses the use of a catalytic composite of a porous carrier material, a rhenium component and a tin component in the hydroprocessing of hydrocarbons and mixtures of hydrocarbons, and especially in a process for hydrogenating an aromatic hydrocarbon to provide a cycloparaffinic hydrocarbon. The term "hydroprocessing" is intended to be synonymous with a process which involves the conversion of hydrocarbons at conditions selected to effect a chemical consumption of hydrogen. Included within the processes intended to be encompassed by the term "hydroprocessing" are hydrocracking, aromatic hydrogenation, ring-opening, hydrorefining or hydrotreating (for nitrogen removal and olefin saturation), desulfurization (often included in hydrorefining) and hydrogenation, etc. As will be recognized, one common attribute of these processes, and the reactions being effected therein, is that they are all "hydrogen-consuming," and are, therefore, exothermic in nature.

The subject of the present invention is the use of a catalytic composite which has exceptional activity and resistance to deactivation when employed in a hydrogen-consuming process. More specifically, the present process uses a dual-function catalytic composite which enables substantial improvements in those hydroprocesses that have traditionally used a dual-function catalyst. The particular catalytic composite constitutes a porous carrier material, a rhenium component, and alkalinous metal component and a tin component; in one preferred embodiment, the catalyst additionally contains a Group VIII noble metal component, for example a palladium component and/or a platinum component.

Catalytic composites having a dual function are used to promote a wide variety of hydrocarbon conversion reactions such as hydrocracking, isomerization, dehydrogenation, hydrogenation, desulfurization, catalytic reforming, ring-opening, cyclization, aromatization, alkylation and transalkylation, polymerization, cracking, etc., some of which reactions are hydrogen-producing while others are hydrogen-consuming. It is to the latter group of reactions, hydrogen-consuming, that the present invention is directly applicable, and especially to the hydrogenation of aromatic hydrocarbons. Regardles of the reaction involved, or the particular process, it is very important that the catalyst exhibit not only the capability to perform its specified functions initally, but also perform them satisfactorily for prolonged periods of time. The analytical terms employed in the art to measure how efficient a particular catalyst performs its intended functions are activity, selectivity and stability. For the purpose of discussion, these terms are conveniently defined herein as follows: (1) activity is a measure of the ability of the catalyst to convert a hydrocarbon feed stock into products at a specified severity level, where severity level alludes to the operating conditions employed—the temperature, pressure, LHSV and hydrogen concentration; (2) selectivity refers to the weight percent, or volume percent of the reactants that are converted into the desired product and/or products; (3) stability connotes the rate of change of the activity and selectivity parameters with time—obviously, the smaller rate implying the more stable catalyst. With respect to the conversion of aromatic hydrocarbons to cycloparaffinic hydrocarbons—i.e. benzene to cyclohexane—activity, stability and selectivity are similarly defined. Thus, "activity" connotes the quantity of benzene being converted. "Selectivity" refers to the quantity of cyclohexane produced from the converted charge stock. "Stability" connotes the rate of change of activity and stability.

As is well known to those skilled in the art, the principal cause of observed deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions enhance the formation of high molecular weight, black, solid or semi-solid, hydrogen-poor carbonaceous material which coats the surface of the catalyst and reduces its activity by shielding its active sites from the reactants. Accordingly, a major problem facing workers in this area is the development of more active and selective catalytic composites that are not as sensitive to the presence of these carbonaceous materials and/or have the capability to suppress the rate of formation of these materials.

I have now found a dual-function catalytic composite which possesses improved activity, selectivity and stability when employed in the hydroprocessing of hydrocarbons, and especially in the hydrogenation of aromatic hydrocarbons, wherein there is effected a chemical consumption of hydrogen. In particular, I have found that the use of a catalytic composite of a rhenium component and a tin component, with a porous carrier material, improves the overall operation of these hydrogen-consuming processes.

Further improvement is attainable through the addition of a Group VIII noble metal component. As indicated, the present invention essentially involves the use of a catalyst containing both a tin component and a rhenium component, enabling the performance characteristics of the process to be sharply and materially improved.

OBJECTS AND EMBODIMENTS

An object of the present invention is to afford a process for the hydroprocessing of a hydrocarbon, or mixtures of hydrocarbons. A corollary objective is to improve the selectivity and stability of aromatic hydrogenation utilizing a highly active, rhenium component/tin component-containing catalytic composite.

Therefore, in one embodiment, the present invention encompasses a process for producing a cycloparaffinic hydrocarbon which comprises reacting hydrogen and an aromatic hydrocarbon in a reaction zone, in contact with a non-acidic catalytic composite of a rhenium component, an alkalinous component, a tin component and a porous carrier material, and separating the resulting reaction zone effluent to provide a hydrogen-rich vaporous phase and to recover said cycloparaffinic hydrocarbon. In another embodiment, the hydroprocessing conditions include a pressure of from 500 to about 2,000 p.s.i.g., a LHSV (defined as volumes of liquid hydrocarbon charge per hour per volume of catalyst disposed in the reaction zone) of from 0.1 to about 10.0, a hydrogen concentration of from 1,000 to about 50,000 scf./bbl. and a maximum catalyst temperature of from 200° F. to about 800° F.

In another embodiment, the process is further characterized in that the catalytic composite is reduced and sulfided prior to contacting the hydrocarbon feed stream. In still another embodiment, my invention involves the addition of a Group VIII noble metal component to the catalytic composite.

Other objects and embodiments of my invention relate to additional details regarding preferred catalytic ingredients, the concentration of components in the catalytic composite, methods of catalyst preparation, preferred processing techniques and the like particulars which are hereinafter given in the following, more detailed description of my invention.

SUMMARY OF INVENTION

As hereinabove set forth, the present invention involves the hydrogenation of hydrocarbons and mixtures of hydrocarbons, utilizing a particular catalytic composite. This catalyst comprises a porous carrier material having combined therewith a rhenium component and a tin component. in many applications, the catalytic composite will also contain a Group VIII noble metal component, and in some select applications, an alkali metal or alkaline-earth metal component. Considering first the porous carrier material, it is preferred that it be a porous, adsorptive, high surface area support having a surface area of about 25 to about 500 square meters per gram. In particular, porous carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, the preferred carrier material is a non-acidic alumina.

As hereinabove set forth, the porous carrier material, for use in the process of the present invention, is a refractory inorganic oxide, either alumina in and of itself, or in combination with one or more other refractory inorganic oxides.

When utilized as the sole component of the carrier material, the alumina may be of the gamma-, eta-, or theta-alumina type, with gamma- or eta-alumina giving the best results. In addition, the preferred carrier materials have an apparent bulk density of about 0.30 to about 0.70 gm./cc. and surface area characteristics such that the average pore diameter is about 20 to about 300 angstroms, the pore volume is about 0.10 to about 1.0 ml./gm. and the surface area is about 100 to about 500 square meters per gram. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed into any desired shape such as spheres, pills, cakes, extrudates, powders, granules, etc., and may further be utilized in any desired size.

An essential constituent of the catalytic composite used in the aromatic hydrogenation process of the present invention is a tin component. This component may be present as an elemental metal or as a chemical compound such as the oxide, sulfide, halide, etc. This component may be incorporated in the catalytic composite in any suitable manner such as by co-precipitation or co-gellation with the porous carrier material, ion-exchange with the carrier material or impregnation of the carrier material at any stage in the preparation. One method involves co-precipitating the tin component during the preparation of the refractory oxide carrier material. This involves the addition of suitable soluble tin compounds, such as stannous or stannic halide, to the hydrosol, and then combining the hydrosol with a suitable gelling agent, and dropping the resulting mixture into an oil bath. Following the calcination step, there is obtained a carrier material comprising an intimate combination of the refractory inorganic oxide and stannic oxide. Another method of incorporating the tin component involves the use of a water-soluble compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and similar compounds. In general, the tin component can be impregnated either prior to, simultaneously with, or after the Group VIII noble metal component, and/or rhenium component is added to the carrier material. It appears, however, that significantly improved processing results are obtained when the tin component is impregnated simultaneously with the rhenium and, when utilized, the Group VIII noble metal components. It has been determined that a preferred impregnation solution contains chloroplatinic acid, perrhenic acid, hydrogen chloride, and stannous or stannic chloride, in an amount to incorporate from 0.01% to about 5.0% by weight of a tin component, as the elemental metal. Regardless of the details of how the components of the catalyst are combined with the carrier material, the final composite will generally be dried at a temperature of about 200° F. to about 600° F., for a period of from about 2 to about 24 hours or more, and finally calcined at a temperature of about 700° F. to about 1100° F. in an atmosphere of air, for a period of about 0.5 to about 10 hours in order to convert the metallic components substantially to the oxide form.

The catalyst for use in the process of the present invention can additionally contain a Group VIII noble metal component. Although specifically directed to the use of a catalytic composite containing platinum, it is intended to include other Group VIII noble metals such as palladium, rhodium, ruthenium, osmium and iridium. The Group VIII noble metal component, for example platinum, may exist within the final catalytic composite as a compound such as an oxide, sulfide, halide, etc., or in an elemental state. The Group VIII noble metal component generally comprises about 0.01% to about 1.0% by weight of the final composite, calculated on an elemental basis. Excellent results are obtained when the catalyst contains about 0.3% to about 0.9% by weight of the platinum group metal. In addition to platinum, another particularly preferred Group VIII noble metal component is palladium, or a compound of palladium.

The Group VIII noble metal component may be incorporated within the catalytic composite in any suitable manner including co-precipitation or co-gellation with the carrier material, ion-exchange, or impregnation. A preferred method of preparation involves the utilization of a water-soluble compound of a Group VIII noble metal component in an impregnation technique. Thus, the platinum component may bea dded to the carrier material by commingling the latter with an aqueous solution of chloroplatinic acid. Other water-soluble compounds of platinum may be employed, and include ammonium chloroplatinate, platinum chloride, dinitro-diamino platinum, etc. In addition it is generally preferred to impregnate the carrier material after it has been calcined in order to minimize the risk of washing away the valuable platinum metal compounds; however, in some instances, it may be advantageous to impregnate the carrier material when it is in a gelled state. Following impregnation, the impregnated carrier is dried and subjected to a high temperature calcination, or oxidation technique as hereinabove set forth.

Another essential component of the catalyst used in the process of the present invention is a rhenium component. This component may be present as an elemental metal, as a chemical compound such as the oxide, sulfide, halide, etc., or as a physical or chemical combination with the porous carrier material and/or other compounds of the catalytic composite. The rhenium component is utilized in an amount sufficient to result in a final catalytic composite containing about 0.01% to about 3.0% by weight rhenium, calculated on an elemental basis. The rhenium component may be incorporated in the catalytic composite in any suitable manner and at any stage in the preparation of the catalyst. It is generally advisable to incorporate the rhenium component after the porous carrier material has been formed in order that the expensive metal will not be lost due to washing and purification treatments which may be applied to the carrier material during the course of its preparation. Although any suitable method for incorporating a catalytic component in a porous carrier material can be utilized to incorporate the rhenium component, the preferred procedure involves impregnation of the porous carrier material. The impregnation solution can, in general, be a solution of a suitable soluble, decomposable rhenium salt such as ammonium perrhenate, sodium perrhenate, potassium perrhenate, and the like salts. In addition, solutions of rhenium halides such as rhenium chloride may be used; the preferred impregnation solution is, however, an aqueous solution of perrhenic acid. The porous carrier material can be impregnated with the rhenium component either prior to, simultaneously with, or after the other components mentioned herein are combined therewith.

When a Group VIII noble metal is utilized with the tin and rhenium components, it is good practice to specify the amounts of the rhenium component and of the tin component as a function of the amount of the Group VIII noble metal component. On this basis, the amount of the rhenium component is ordinarily selected so that the atomic ratio of the Group VIII noble metal to rhenium, contained in the composite, is about 0.05:1 to about 2.75:1 with the preferred range being about 0.25:1 to about 2.0:1. Similarly, the amount of the tin component is ordinarily selected to produce a composite containing an atomic ratio of the Group VIII noble metal to tin of about 0.1:1 to about 3:1 with the preferred range being about 0.5:1 to about 1.5:1. Considering the above discussion of each of the essential and preferred components of the catalytic composite, it is evident that a preferred catalytic composite comprises a combination of a platinum component, a rhenium component and a tin component, in amounts sufficient to result in a composite containing about 0.01% to about 1.0% by weight of platinum, about 0.01% to about 1.0% by weight of rhenium and about 0.01% to about 5.0% by weight of tin.

Although not essential to successful hydroprocessing in all cases, in fact detrimental in aromatic hydrogenation, a halogen component may be incorporated in the catalytic composite. The combined halogen may be either fluorine, chlorine, iodine, bromine, or mixtures thereof. Of these, fluorine and particularly chlorine are preferred for some of the hydrocarbon hydroprocesses encompassed by the present invention. The halogen may be added to the carrier material in any suitable manner, and either during preparation of the carrier or before, or after, the addition of the other components. For example, the halogen may be added at any stage in the preparation of the carrier material, or to the calcined carrier material, and as an aqueous solution of an acid such as hydrogen fluoride, hydrogen chloride, hydrogen bromide, hydrogen iodide, etc. The hydrosol, which is typically utilized to form an amorphous carrier material, may contain halogen and thus contribute at least a portion of the halogen component to the final composite. The quantity of halogen is such that the final catalytic composite contains about 0.1% to about 1.5% by weight, and preferably from about 0.5% to about 1.2%, calculated on an elemental basis.

In those processes wherein the acid function of the catalytic composite must necessarily be attenuated, the metallic components will be combined with a carrier material consisting essentially of alumina. In this latter situation, a halogen component is not combined with the catalytic composite, and, the inherent acid function of Group VIII noble metals is further attenuated through the addition of from 0.01% to about 1.5% by weight of an alkalinous metal component. One such process, in which the acid function of the catalyst employed must necessarily be attenuated, is the process wherein an aromatic hydrocarbon is hydrogenated to produce the corresponding cycloparaffin. Specifically, a benzene-concentrate is often used as the starting material for the production of cyclohexane primarily to satisfy the demand therefor in the manufacture of nylon. In order to avoid ring-opening which results in loss of both the benzene and the cyclohexane product, an alkalinous metal component is combined with the catalytic composite in an amount of from 0.01% to about 1.5% by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

Prior to its use in the hydroprocessing of hydrocarbons, the calcined catalytic composite may be subjected to a substantially water-free reduction technique. This technique is designed to insure a uniform and finely-divided dispersion of the metallic components throughout the carrier material. Preferably, substantially pure and dry hydrogen (i.e. less than about 30.0 volume p.p.m. of water) is employed as the reducing agent. The calcined catalyst is contacted at a temperature of about 800° F. to about 1200° F., and for a period of time of about 0.5 to about 10 hours, or more. This reduction technique may be performed in situ as part of a start-up sequence provided precautions are observed to pre-dry the unit to a substantially water-free state.

Again, with respect to effecting hydrogen-consuming reactions, the process is generally improved when the reduced composite is subjected to a presulfiding operation designed to incorporate from about 0.05 to about 0.50% by weight of sulfur, on an elemental basis, in the catalytic composite. This presulfiding treatment takes place in the presence of hydrogen and a suitable sulfur-containing compound including hydrogen sulfide, lower molecular weight mercaptans, organic sulfides, etc. The procedure constitutes treating the reduced catalyst with a sulfiding gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. up to about 1100° F.

According to the present invention, a hydrocarbon charge stock and hydrogen are contacted with a catalyst of the type described above in a hydrocarbon conversion zone. The contacting may be accomplished by using the catalyst in a fixed-bed system, a moving-bed system, a fluidized-bed system, or in a batch-type operation; however, in view of the risk of attrition losses, it is preferred to use the fixed-bed system. Furthermore, it is well known that a fixed-bed catalytic system offers many operation advantages. In this type of system, a hydrogen-rich gas and the charge stock are preheated by any suitable heating means to the desired temperature, and then are passed into a conversion zone containing the fixed-bed of the catalytic composite. It is understood, of course, that the conversion zone may be one or more separate reactors having suitable means therebetween to insure that the desired conversion temperature is maintained at the entrance to each reactor. It is also to be noted that the reactants may be contacted with the catalyst bed in either upward, downward, or radial flow fashion, with the latter being preferred. Additionally, the reactants may be in the liquid phase, a mixed liquid-vapor phase, or a vapor phase when they contact the catalyst.

The operating conditions imposed upon the reaction zones are dependent upon the particular hydrocarbon hydroprocess being effected. However, these operating conditions will include a pressure from about 500 to about 2,000 p.s.i.g., a liquid hourly space velocity of about 0.1 to about 10.0, and a hydrogen concentration within the range of about 1,000 to about 50,000 scf./bbl. In view of the fact that the reactions being effected are exothermic in nature, an increasing temperature gradient is experienced as the hydrogen and feed stock traverse the catalyst bed. For any given hydrogen-consuming process, it is desirable to maintain the maximum catalyst bed temperature below about 900° F., which temperature is virtually identical to that as conveniently measured at the outlet of the reaction zone. Aromatic hydrogenation processes are conducted at a catalyst temperature in the range of about 200° F. to about 800° F., and it is intended herein that the stated temperature of operation alludes to the maximum catalyst bed temperature. In order to assure that the catalyst bed temperature does not exceed the maximum allowed, the use of conventional quench streams, either normally liquid or gaseous, introduced at one or more intermediate loci of the catalyst bed, may be utilized.

Specific operating conditions, processing techniques, particular catalytic composites and other individual process details will be given in the following detailed description. These will be presented by way of examples given in conjunction with commercially-scaled operating units. In presenting these examples, it is not intended that the invention be limited to the specific illustrations, particular operating conditions, catalytic composite, processing techniques, charge stock, etc. It is understood, therefore, that the present invention is merely illustrated by the specifics hereinafter set forth.

ILLUSTRATIVE EXAMPLES

In this example, the present invention is illustrated as applied to the hydrogenation of aromatic hydrocarbons such as benzene, toluene, the various xylenes, naphthalenes, etc., to form the corresponding cyclic paraffins. When applied to the hydrogenation of aromatic hydrocarbons, which are contaminated by sulfurous compounds, primarily thiophenic compounds, the process is advantageous in that it affords 100.0% conversion without the necessity for the substantially complete prior removal of the sulfur compounds. The corresponding cyclic paraffins, resulting from the hydrogenation of the aromatic nuclei, include compounds such as cyclohexane, mono-, di-, tri-substituted cyclohexanes, decahydronaphthalene, tetrahydronaphthalene, etc., which find widespread use in a variety of commercial industries in the manufacture of nylon, as a solvent for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal or iso-paraffinic components, and the naphthenes contained therein. Benzene is readily recovered from the selected solvent by way of distillation, and in a purity of 99.0%, or more. Heretofore, the hydrogenation of aromatic hydrocarbons, for example benzene, has been effected with a nickel-containing catalyst at hydrogenation conditions. This is disadvantageous in many respects, especially from the standpoint that nickel is quite sensitive to sulfurous compounds which may be contained in the benzene concentrate. In accordance with the present process, the benzene is hydrogenated in contact with a non-acidic catalytic composite containing 0.01% to about 1.0% by weight of a Group VIII noble metal component, from about 0.01% to about 1.0% by weight of a rhenium component, from about 0.01% to about 5.0% by weight of a tin component and from about 0.01% to about 1.5% by weight of an alkalinous metal component. Operating conditions include a maximum catalyst bed temperature in the range of about 200° F. to about 800° F., a pressure of from 500 to about 2,000 p.s.i.g., a liquid hourly space velocity of about 1.0 to about 10.0 and a hydrogen concentration in an amount sufficient to yield a mole ratio of hydrogen to cyclohexane, in the product effluent, not substantially less than about 4.0:1. Although not essential, one preferred operating technique involves the use of three reaction zones, each of which contains approximately one-third of the total quantity of catalyst employed. The process is further facilitated when the total fresh benzene is added in three approximately equal portions, one each to the inlet of each of the three reaction zones. While the benzene, therefore, passes in parallel flow through the reaction zones, the hydrogen and cyclohexane recycle passes in series flow through the reaction zones.

The catalyst utilized is a substantially halogen-free alumina carrier material combined with about 0.5% by weight of tin, 0.25% by weight of rhenium, 0.375% by weight of platinum, and about 0.50% by weight of lithium, all of which are calculated on the basis of the elemental metals. The hydrogenation process will be described in connection with a commercially-scaled unit having a fresh benzene feed capacity of about 750 bbl./day. In the instant illustration, the total fresh benzene feed rate is about 542 bbl./day, of which 190 barrels is utilized to remove toluene and other alkylbenzenes from a make-up hydrogen stream in an absorber. The toluene-free make-up gas is then admixed with about 700 bbl./day of a cyclohexane-rich product recycle stream, the mixture being introduced into the first of a series of three reaction zones.

On a moles per hour basis, the total fresh benzene feed constitutes 89.53 moles per hour, of which 32.0 moles per hour is utilized in the make-up gas absorber. This make-up gas, being introduced into the system from a hydrodealkylation process, contains about 4.76 moles per hour of benzene. The make-up gas from the absorber, being transmitted to the hydrogenation unit, and being combined, as above set forth, with a cyclohexane-rich product recycle, contains 7.10 moles per hour of benzene. Of the 57.53 moles per hour of fresh benzene feed, 18.67 moles per hour are introduced into the first reaction zone. Following suitable heat-exchange with various hot effluent streams, the total feed to the first reaction zone is at a temperature of 390° F. and a pressure of 490 p.s.i.g. The reaction zone effluent is at a temperature of 595° F. and a pressure of about 485 p.s.i.g. The total effluent from the first reaction zone is utilized as a heat-exchange medium, in a steam generator, whereby the temperature is reduced to a level of about 445° F. The cooled efluent is admixed with about 27.23 moles per hour of fresh benzene feed, at a temperature of 100° F.; the resulting temperature is 390° F., and the mixture enters the second reaction zone at a pressure of about 475 p.s.i.g. The second reaction zone effluent, at a pressure of 470 p.s.i.g. and a temperature of 600° F., is also utilized as a heat-exchange medium to generate steam, whereby the temperature is reduced to a level of about 415° F. Upon being admixed with an additional 11.63 moles per hour of fresh benzene feed, the temperature is again 390° F., and the mixture enters the third reaction zone at a pressure of about 460 p.s.i.g. The third reaction zone effluent is at a temperature of about 480° F. and a pressure of about 455 p.s.i.g. Through utilization as a heat-exchange medium, the temperature is reduced to a level of about 200° F., and subsequently reduced to a level of about 100° F. through the use of an air-cooled condenser. The cooled third reaction zone effluent is introduced into a high pressure separator, at a pressure of about 420 p.s.i.g.

A hydrogen-rich vaporous phase is withdrawn from the high pressure separator and recycled by way of compressive means, at a pressure of about 490 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at an operating pressure of about 250 p.s.i.g., a top temperature of about 160° F. and a bottom temperature of about 430° F. The cyclohexane product is withdrawn from the stabilizer as a bottoms stream, the overhead stream being vented to fuel. The cyclohexane concentrate is recovered in an amount of about 64.10 moles per hour, of which only about 0.10 mole per hour constitutes other hexanes. In brief summation, of the 4,800 pounds per hour of fresh benzene feed (including about 386 pounds per hour in the make-up hydrogen stream), 5,400 pounds per hour of cyclohexane product is recovered.

In the present example, the catalyst utilized is a substantially halogen-free alumina carrier material combined with about 0.5% by weight of tin, 0.375% by weight of rhenium and about 0.80% by weight of lithium, all of which are calculated on the basis of the elemental metals. The hydrogenation process will be described in connection with a commercially-scaled unit having a fresh benzene feed capacity of about 1,000 bbl./day. In the instant illustration, the total fresh benzene feed rate is about 721 bbl./day, of which 253 barrels is utilized to remove toluene from a makeup hydrogen stream in an absorber. The toluene-free makeup gas is then admixed with about 930 bbl./day of a cyclohexane-rich product recycle stream, the mixture being introduced into the first of a series of three reaction zones.

On a mols per hour basis, the total fresh benzene feed constitutes 119.25 mols per hour, of which about 42.5 mols per hour is utilized in the make-up gas absorber. This make-up gas, being introduced into the system from a hydrodealkylation process, contains about 6.33 mols per hour of benzene. The make-up gas from the absorber, being transmitted to the hydrogenation unit, and being combined, as above set forth, with a cyclohexane-rich product recycle, contains about 9.45 mols per hour of benzene. Of the 76.75 mols per hour of fresh benzene feed, about 24.80 mols per hour are introduced into the first reaction zone. Following suitable heat-exchange with various hot effluent streams, the total feed to the first reaction zone is at a temperature of 390° F. and a pressure of 450 p.s.i.g. The reaction zone effluent is at a temperature of 605° F. and a pressure of about 445 p.s.i.g. The total effluent from the first reaction zone is utilized as a heat-exchange medium, in a steam generator, whereby the temperature is reduced to a level of about 445° F. The cooled effluent is admixed with about 36.25 mols per hour of fresh benzene feed, at a temperature of 90° F., the resulting temperature being 390° F. The mixture enters the second reaction zone at a pressure of about 435 p.s.i.g. The second reaction zone effluent, at a pressure of 430 p.s.i.g. and a temperature of 600° F. is also utilized as a heat-exchange medium to generate steam whereby the temperature is reduced to a level of about 415° F. Upon being admixed with 15.70 mols per hour of fresh benzene feed, the temperature is again 390° F., and the mixture enters the third reaction zone at a pressure of about 420 p.s.i.g. The third reaction zone effluent is at a temperature of about 480° F. and a pressure of about 415 p.s.i.g. Again, through the utilization of the effluent as a heat-exchange medium, the temperature is reduced to a level of about 200° F., and subsequently reduced to a level of about 90° F. through the use of an air-cooled condenser. The cooled third reaction zone effluent is introduced into a high pressure separator, at a pressure of about 380 p.s.i.g.

A hydrogen-rich vaporous phase is withdrawn from the high pressure separator and is recycled by way of compressive means, at a pressure of about 450 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at an operating pressure of about 250 p.s.i.g., a top temperature of about 160° F. and a bottom temperature of about 430° F. The cyclohexane product is withdrawn from the stabilizer as a bottoms stream, the overhead stream being vented to fuel. The cyclohexane concentrate is recovered in an amount of about 84.12 mols per hour, of which only about 0.19 mol per hour constitutes other hexanes. In brief summation, of the 6,380 pounds per hour of fresh benzene feed (including about 514 pounds per hour in the make-up hydrogen stream) 7,075 pounds per hour of cyclohexane product is recovered.

The foregoing specification, and particularly the examples, indicates the method by which the present invention is effected, and the benefits afforded through the utilization thereof.

I claim as my invention:

1. A process for producing a cycloparaffinic hydrocarbon which comprises reacting hydrogen and an aromatic hydrocarbon at a temperature of from about 200° F. to about 800° F. and a pressure of from about 500 to about 2000 p.s.i.g. in contact with a non-acidic catalytic composite of a porous carrier material, from about 0.01% to about 1.0% by weight of a Group VIII noble metal component, from about 0.01% to about 5.0% by weight of a tin component, from about 0.01% to about 3.0% by weight of a rhenium component and from about 0.01% to about 1.5% by weight of an alkali metal or alkaline earth metal component, and separating the resulting reaction effluent to provide a hydrogen-rich vaporous phase and to recover said cycloparaffinic hydrocarbon.

2. The process of claim 1 further characterized in that said aromatic hydrocarbon is benzene.

3. The process of claim 1 further characterized in that said aromatic hydrocarbon is toluene.

4. The process of claim 1 further characterized in that said aromatic hydrocarbon is a xylene.

5. The process of claim 1 further characterized in that said aromatic hydrocarbon is a naphthalene.

6. The process of claim 1 further characterized in that said alkali or alkaline earth metal component is a lithium component.

7. The process of claim 1 further characterized in that said Group VIII noble metal is platinum.

8. The process of claim 1 further characterized in that said porous carrier material is alumina.

9. The process of claim 1 further characterized in that said Group VIII noble metal is platinum, said porous carrier material is alumina and said alkali or alkaline earth metal is lithium.

References Cited

UNITED STATES PATENTS

| 3,422,001 | 1/1969 | Kouwenhoven et al. | 260—667 |
| 3,480,531 | 5/1969 | Muloskey | 260—667 |
| 3,509,227 | 4/1970 | Asano et al. | 260—667 |

DELBERT E. GANTZ, Primary Examiner

V. O'KEEFE, Assistant Examiner